United States Patent [19]
Planche et al.

[11] Patent Number: 6,020,404
[45] Date of Patent: Feb. 1, 2000

[54] BITUMEN/POLYMER COMPOSITIONS WITH IMPROVED STABILITY AND THEIR APPLICATION IN CARRYING OUT SURFACING OPERATIONS

[75] Inventors: Jean-Pascal Planche, St. Just Chaleyssin; Patrick Turello, Francheville; Claude Lacour, Vienne, all of France

[73] Assignee: Elf Antar France Tour Elf-2 Place de la Coupole, Courbevoie, France

[21] Appl. No.: 08/983,300

[22] PCT Filed: May 6, 1997

[86] PCT No.: PCT/FR97/00811

§ 371 Date: Apr. 13, 1998

§ 102(e) Date: Apr. 13, 1998

[87] PCT Pub. No.: WO97/43341

PCT Pub. Date: Nov. 20, 1997

[30] Foreign Application Priority Data

May 10, 1996 [FR] France .................................. 96 05827

[51] Int. Cl.⁷ .............................. C08L 95/00; C08L 63/08
[52] U.S. Cl. ............................ 523/450; 523/351; 524/59; 524/69; 524/70; 524/71; 524/68

[58] Field of Search ..................................... 523/351, 450; 524/59, 68, 69, 70, 71; 428/489

[56] References Cited

U.S. PATENT DOCUMENTS

| 4,818,367 | 4/1989 | Winkler ...................................... 524/69 |
| 4,978,698 | 12/1990 | Woodhams ................................ 524/69 |
| 5,266,615 | 11/1993 | Omeis et al. ............................. 524/69 |
| 5,331,028 | 7/1994 | Goodrich .................................. 524/68 |
| 5,556,900 | 9/1996 | Goodrich et al. ......................... 524/59 |
| 5,744,524 | 4/1998 | Manandhar et al. ...................... 524/70 |

*Primary Examiner*—Peter A. Szekely
*Attorney, Agent, or Firm*—Burgess, Ryan & Wayne

[57] ABSTRACT

Bitumen/polymer compositions are provided containing a bitumen or a mixture of bitumens and, reckoned by weight of bitumen, 0.3% to 20% of at least one primary polymer selected among certain elastomers and plastomers and 0.01% to 12% of at least one olefinic polymer bearing epoxy or COOH groupings. The compositions are useful, directly or after dilution, to form bitumen/polymer binders for carrying out road surfacing, for coated materials or waterproof coatings.

20 Claims, No Drawings

BITUMEN/POLYMER COMPOSITIONS WITH IMPROVED STABILITY AND THEIR APPLICATION IN CARRYING OUT SURFACING OPERATIONS

BACKGROUND OF THE INVENTION

1. Field of the Invention

The invention relates to bitumen/polymer compositions having an improved stability which is reflected, in particular, by a very good ability to be stored while hot and by excellent mechanical properties. It further relates to the application of the said compositions to the production of surfacings and in particular of road surfacings, of bituminous mixes or alternatively of watertight facings.

2. Background Art

It is known to use bituminous compositions as various surface coatings and in particular as road surface coatings, provided that these compositions have a certain number of essential mechanical qualities.

These mechanical qualities are assessed, in practice, by determining, by standardized tests, a series of mechanical characteristics, the most widely used of which are as follows:

softening temperature (abbreviated to RBT), expressed in 0° C. and determined by the ring-and-ball test defined by NF Standard T 66008, brittleness point or Fraass point, expressed in 0° C. and determined according to IP Standard 80/53, penetrability, expressed in ¹⁄₁₀ of an mm and determined according to NF Standard T 66004, tensile Theological characteristics, determined according to NF Standard T 46002 and comprising the quantities:

yield stress $\sigma_y$ in bars, elongation at yield stress $\epsilon_y$ in %, breaking stress $\sigma_b$ in bars, elongation at break $\epsilon_b$ in %.

In general, conventional bitumens do not simultaneously exhibit all the required qualities and it has been known for a long time that the addition of varied polymers to these conventional bitumens makes it possible to favourably modify the mechanical properties of the said bitumens and to form bitumen/polymer compositions having improved mechanical qualities with respect to those of the bitumens alone.

The polymers capable of being added to the bitumens can be elastomers, such as polyisobutylene, polyisoprene, polybutadiene, polychloroprene, butyl rubber, random ethylene/propylene (EP) copolymers, random ethylene/propylene/diene (EPDM) terpolymers, or polynorbornene, or alternatively plastomers, such as polypropylene, polyethylenes, ethylene/vinyl acetate copolymers, ethylene/methyl acrylate copolymers or ethylene/butyl acrylate copolymers.

Bitumen/polymer compositions based on a bitumen or mixture of bitumens and on one or more polymers of the abovementioned type have a limited stability on storage. Phase separation takes place fairly quickly between the bituminous phase and the polymer phase with, as a consequence, a deterioration in the physicomechanical properties of the said compositions after a relatively short storage time.

It has been found that the incorporation of olefinic polymers carrying epoxy or COOH functional groups in bitumen/polymer compositions composed of a bitumen or mixture of bitumens and of one or more polymers such as mentioned above significantly improved the stability of the said compositions on storage and, by the same token, ensured the maintenance of, indeed even an improvement in, their physicomechanical characteristics.

SUMMARY OF THE INVENTION

The subject of the invention is bitumen/polymer compositions with improved stability comprising a bitumen or mixture of bitumens and, by weight of the bitumen or mixture of bitumens, 0.3% to 20% and more particularly 0.5% to 10% of at least one primary polymer chosen from the group formed by homopolymers of conjugated dienes, copolymers of conjugated dienes with one another, polynorbornenes, polyisobutylenes, butyl rubber, homopolymers of $C_2$ to $C_4$ olefins, copolymers of ethylene and of propylene, terpolymers of ethylene, of propylene and of a $C_4$ to $C_{12}$ diene or α-olefin, and copolymers of ethylene and of at least one monomer A of formula

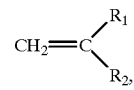

where $R_1$ denotes H, $CH_3$ or $C_2H_5$ and $R_2$ represents a —$COOR_5$, —$OR_5$, —$OOCR_6$ or phenyl radical with $R_5$ denoting a $C_1$ to $C_{10}$ and preferably $C_1$ to $C_6$ alkyl and $R_6$ representing H or a $C_1$ to $C_3$ alkyl, the said compositions being characterized in that they additionally contain, by weight of the bitumen or mixture of bitumens, 0.01% to 12% and preferably 0.1% to 5% of an olefinic polymer containing epoxy or COOH functional groups chosen from copolymers containing, by weight, x % of units resulting from ethylene or propylene, y % of units resulting from one or more above-mentioned monomers A, z % of units resulting from at least one monomer B of formula

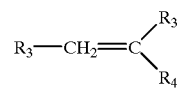

and v % of units resulting from one or more monomers C other than the monomers A and B, with $R_1$ denoting H, $CH_3$ or $C_2H_5$, $R_3$ denoting H, COOH or $COOR_5$, $R_4$ representing a —COOH,

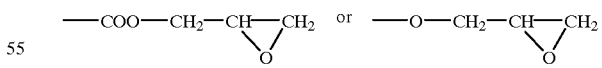

radical, $R_5$ being a $C_1$ to $C_{10}$ and preferably $C_1$ to $C_6$ alkyl radical and x, y, z and v representing numbers such that $40 \leq x \leq 99.9$, $0 \leq y \leq 50$, $0.1 \leq z \leq 20$ and $0 \leq v \leq 15$ with $x+y+z+v=100$, with the exception of the above bitumen/polymer compositions which contain, by weight of the bitumen or mixture of bitumens, either (i) 0.1% to 10% of olefinic copolymer containing epoxy groups and, simultaneously, as primary polymers, 0.1% to 10% of a copolymer of ethylene and of a monomer having the formula

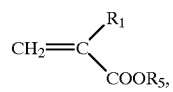

$R_1$ and $R_5$ having the meaning given above, 0% to 10% of a thermoplastic elastomer D and 0% to 10% of an EVA copolymer, or else (ii) 0.5% to 4% of olefinic copolymer containing epoxy groups and, simultaneously, as primary polymers used in conjunction, 2% to 6% of a thermoplastic elastomer D and 0.5% to 5% of an EVA copolymer, the elastomer D being chosen from polybutenes, polybutadienes, polyisoprenes, ethylene/propylene copolymers, ethylene/butene copolymers and ethylene/diene copolymers.

Preferably, in the abovementioned copolymers, x, y, z and v are such that $50 \leq x \leq 99.5$, $0 \leq y \leq 40$, $0.5 \leq z \leq 15$ and $0 \leq v \leq 10$ with $x+y+z+v=100$.

DESCRIPTION OF THE PREFERRED EMBODIMENTS

The monomers A of formula

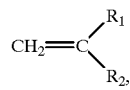

which provide

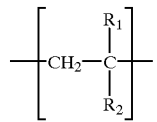

units in the copolymer containing them, are chosen in particular from vinyl formate, vinyl acetate, vinyl propionate, vinyl butyrate, vinyl ethers $CH_2=CH-O-R_5$ where $R_5$ is a $C_1$ to $C_{10}$ and preferably $C_1$ to $C_6$ alkyl radical, such as methyl, ethyl, propyl, butyl, pentyl or hexyl, or alkyl acrylates and methacrylates of formula

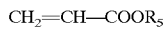

and

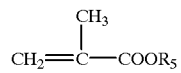

respectively, where $R_5$ has the meaning given above.

The monomers B of formula

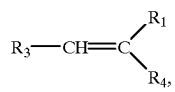

which provide

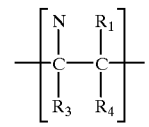

units in the functionalized olefinic copolymer, are chosen in particular from maleic acid and its anhydride, acrylic acid, methacrylic acid, alkyl hydrogen maleates of formula $HOOC-CH=CH-COOR_7$ where $R_7$ is a $C_1$ to $C_6$ alkyl radical, such as methyl, ethyl, propyl or butyl, glycidyl acrylates and methacrylates of formula

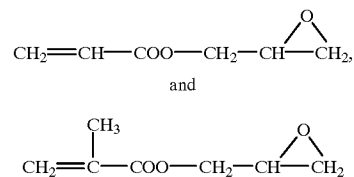

respectively, vinyl alcohol and glycidyl vinyl ether of formula

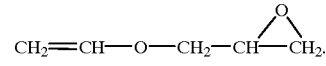

The monomers C, the presence of which in the olefinic copolymer is optional, are monomers which can be polymerized by the radical route other than the monomers A and B, such as, for example, CO, $SO_2$ and acrylonitrile.

In particular, the olefinic copolymers carrying epoxy or COOH functional groups are chosen from:

(a) random copolymers of ethylene and of a monomer B chosen from acrylic acid, methacrylic acid, maleic acid or its anhydride, glycidyl acrylate and glycidyl methacrylate which contain, by weight, 80% to 99.7% and preferably 85% to 99.5% of ethylene;

(b) random terpolymers of ethylene, of a monomer A chosen from vinyl acetate and alkyl acrylates or methacrylates containing a $C_1$ to $C_6$ alkyl residue, such as methyl, ethyl, propyl, butyl or hexyl, and of a monomer B chosen from acrylic acid, methacrylic acid, maleic acid or its anhydride, glycidyl acrylate and glycidyl methacrylate which contain, by weight, 0.5% to 40% of units resulting from the monomer A and 0.5% to 15% of units resulting from the monomer B, the remainder being formed of units resulting from ethylene; and (c) copolymers resulting from the grafting of a monomer B chosen from acrylic acid, methacrylic acid, maleic acid or its anhydride, glycidyl acrylate and glycidyl methacrylate on a substrate composed of a polymer chosen from polyethylenes, in particular low density polyethylenes, polypropylenes and random copolymers of ethylene and of vinyl acetate or of ethylene and of alkyl acrylate or methacrylate containing a $C_1$ to $C_6$ alkyl residue, such as methyl, ethyl, propyl, butyl or hexyl, which contain, by weight, 40% to 99.7% and preferably 50% to 99% of ethylene, the said grafted copolymers containing, by weight, 0.5% to 15% of grafted units resulting from the monomer B.

The olefinic copolymers containing epoxy or COOH functional groups chosen from:

(i) random terpolymers of ethylene, of alkyl acrylate or methacrylate containing a $C_1$ to $C_6$ alkyl residue, such as methyl, ethyl or butyl, and of maleic anhydride which contain, by weight, 0.5% to 40% of units resulting from alkyl acrylate or methacrylate and 0.5% to 15% of units resulting from maleic anhydride, the remainder being formed of units resulting from ethylene;

(ii) random terpolymers of ethylene, of alkyl acrylate or methacrylate containing a $C_1$ to $C_6$ alkyl residue, such as methyl, ethyl or butyl, and of glycidyl acrylate or methacrylate which contain, by weight, 0.5% to 40% of units resulting from alkyl acrylate or methacrylate and 0.5% to 15% of units resulting from glycidyl acrylate or methacrylate, the remainder being formed of units resulting from ethylene;

(iii) low density polyethylenes grafted with maleic anhydride and polypropylenes grafted with maleic anhydride which contain, by weight, 0.5% to 15% of grafted units resulting from maleic anhydride;

(iv) low density polyethylenes grafted with glycidyl acrylate or methacrylate and polypropylenes grafted with glycidyl acrylate or methacrylate which contain, by weight, 0.5% to 15% of grafted units resulting from the glycidyl derivative; are particularly preferred.

The olefinic copolymers carrying epoxy or COOH functional groups used to produce the bitumen/polymer composition advantageously have molecular masses such that the melt flow index of the said copolymers, determined according to ASTM Standard D 1238 (test carried out at 190° C. under a load of 2.16 kg), has a value, expressed in grams per 10 minutes, of between 0.3 and 3000 and preferably between 0.5 and 900.

The bitumen or mixture of bitumens which is used for the implementation the process according to the invention is advantageously chosen from the various bitumens which have a kinematic viscosity at 100° C. of between $0.5 \times 10^{-4}$ $m^2/s$ and $3 \times 10^{-2}$ $m^2/s$ and preferably between $1 \times 10^{-4}$ $m^2/s$ and $2 \times 10^{-2}$ $m^2/s$. These bitumens can be direct distillation or vacuum distillation bitumens or else blown or semiblown bitumens, propane or pentane deasphalting residues, viscosity breaking residues, indeed even some petroleum cuts or mixture of bitumens and of vacuum distillates or alternatively mixtures of at least two of the products which have just been listed. Besides a kinematic viscosity included within the above-mentioned ranges, the bitumen or mixture of bitumens used in the process according to the invention advantageously exhibits a penetrability at 25° C., defined according to NF Standard T 66004, of between 5 and 800 and preferably between 10 and 400.

The primary polymer can be in particular polybutadiene, polyisoprene, polychloroprene, butadiene/isoprene copolymers, polynorbornene, polyisobutylene, butyl rubber, high density polyethylene, low density polyethylene, polypropylene, polybutene, random ethylene/propylene (EP) copolymers, random ethylene/propylene/diene (EPDM) terpolymers, ethylene/vinyl acetate (EVA) copolymers, ethylene/$C_1$ to $C_6$ alkyl acrylate copolymers, in particular ethylene/methyl acrylate copolymers and ethylene/butyl acrylate copolymers, and ethylene/$C_1$ to $C_6$ alkyl methacrylate copolymers, in particular ethylene/ethyl methacrylate copolymers and ethylene/butyl methacrylate copolymers, ethylene/styrene copolymers or ethylene/butene/styrene copolymers.

If appropriate, at least a portion of the primary polymer can be composed of milled waste from the said polymer.

The bitumen/polymer composition is prepared by bringing the primary polymer or polymers and the functionalized olefinic polymer or polymers containing epoxy or COOH groups into contact with the bitumen or mixture of bitumens in proportions chosen within the ranges defined above, the operation being carried out at temperatures of between 100° C. and 230° C., more particularly between 120° C. and 190° C., and with stirring, for a period of time of at least 10 minutes, generally of the order of a few tens of minutes to a few hours and, for example, from 10 minutes to 8 hours and more particularly from 10 minutes to 5 hours, to form a homogeneous mass constituting the bitumen/polymer composition. The primary polymer can be incorporated in the bitumen or mixture of bitumens before or after the olefinic polymer containing epoxy or COOH groups, it also being possible for a simultaneous incorporation to be envisaged.

During its formation, the bitumen/polymer composition can also have added to it 1% to 40% and more particularly 2% to 30%, by weight of the bitumen, of a fluxing agent which can be composed, in particular, of a hydrocarbon oil exhibiting an atmospheric pressure distillation range, determined according to ASTM Standard D 86-67, of between 100° C. and 600° C. and lying more especially between 150° C. and 400° C. This hydrocarbon oil, which can in particular be a petroleum cut of aromatic nature, a petroleum cut of naphtheno-aromatic nature, a petroleum cut of naphtheno-paraffinic nature, a petroleum cut of paraffinic nature, a coal oil or alternatively an oil of plant origin, is sufficiently "heavy" to limit the evaporation at the time of its addition to the bitumen and, at the same time, sufficiently "light" to be removed as much as possible after the bitumen/polymer composition containing it has been spread, so as to regain the same mechanical properties which the bitumen/polymer composition prepared without using any fluxing agent would have exhibited after hot spreading. The fluxing agent can be added to the reaction mixture, which is formed from the bitumen, from the sulphur-crosslinkable elastomer and from the sulphur-donor coupling agent, at any point in the formation of the said reaction mixture, the amount of fluxing agent being chosen, within the ranges defined above, in order to be compatible with the desired final use on the work site.

The mixture based on bitumen or mixture of bitumens, on primary polymer or polymers, on olefinic polymer(s) carrying epoxy or COOH groups and optionally on fluxing agent, which gives rise to the bitumen/polymer composition, can also contain one or more non-polymer additives capable of reacting with the epoxy or COOH groups of the functionalized olefinic polymer. These reactive additives can in particular be primary or secondary amines, especially polyamines, alcohols, especially polyols, acids, especially polyacids, or alternatively metal salts.

Reactive additives of the amine type are, for example, aromatic diamines, such as 1,4-diaminobenzene, 2,4-diaminotoluene, diaminonaphthalene, bis(4-amino-phenyl) sulphone, bis(4-aminophenyl) ether or bis-(4-aminophenyl) methane, aliphatic or cycloaliphatic diamines, such as those of formula $H_2N-R_{13}-NH_2$ where $R_{13}$ denotes a $C_2$ to $C_{12}$ alkylene or $C_6$ to $C_{12}$ cycloalkylene radical, for example ethylenediamine, diaminopropane, diaminobutane, diaminohexane, diaminooctane, diaminodecane, diaminododecane, diaminocyclohexane, diaminocyclooctane or diaminocyclododecane, polyethylenepolyamines or polypropylenepolyamines, such as diethylenetriamine, triethylenetetramine, tetraethylenepentamine or dipropylenetriamine, or alternatively fatty amines or polyamines, that is to say amines or polyamines containing a $C_{12}$ to $C_{18}$ alkyl or alkenyl radical connected to the nitrogen atom of an amine group.

Reactive additives of the alcohol type are, in particular, polyols, such as diols or triols and especially diols of formula HO—$R_{14}$—OH, where $R_{14}$ denotes a hydrocarbon radical, especially a $C_2$ to $C_{18}$ alkylene, $C_6$ to $C_8$ arylene and $C_6$ to $C_8$ cycloalkylene radical, and polyetherdiols of formula HO—$[C_qH_{2q}O]_rH$, where q is a number ranging from 2 to 6 and especially equal to 2 or 3 and r is a number at least equal to 2 and, for example, ranging from 2 to 20. Examples of such polyols are ethylene glycol, propylene glycol, butylene glycol, diethylene glycol, triethylene glycol, tetraethylene glycol, hexanediol or octanediol.

Reactive additives of the acid type are, in particular, polyacids of formula HOOC—$R_{14}$—COOH, where $R_{14}$ has the meaning given above. Examples of such polyacids are phthalic acid, terephthalic acid, malonic acid, succinic acid, adipic acid and glutaric acid.

Reactive additives of the metal salt type are, in particular, compounds, such as hydroxides, oxides, alkoxides, carboxylates, such as formates and acetates, methoxides, ethoxides, nitrites, carbonates and bicarbonates, of metals from groups I, II, III and VIII of the Periodic Table of the Elements, especially Na, K, Li, Mg, Ca, Cd, Zn, Ba, Al and Fe.

The amount of the reactive additive or of the reactive additives which are incorporated in the reaction mixture giving rise to the bitumen/polymer compositions can range from 0.01% to 10% and more particularly from 0.05% to 5% of the weight of bitumen present in the said reaction mixture.

In addition to the reactive additives and the fluxing agent, it is also possible to incorporate in the bitumen/polymer compositions, at any time in their formation, additives conventionally used in bitumen/polymer compositions, such as promoters of adhesion of the bitumen/polymer composition to mineral surfaces or alternatively fillers, such as talc, carbon black or worn tyres reduced to fine powder.

When the bitumen/polymer composition contains a fluxing agent composed of a hydrocarbon oil as defined above, it is possible to produce the said bitumen/polymer composition by incorporating the olefinic polymer carrying epoxy or COOH groups and the primary polymer in the bitumen or mixture of bitumens in the form of a mother solution of these polymers in the hydrocarbon oil constituting the fluxing agent.

The mother solution is prepared by bringing ingredients composing it, namely hydrocarbon oil serving as solvent, olefinic polymer containing epoxy or COOH groups and/or primary polymer and, if appropriate, reactive additive, into contact at temperatures of between 10° C. and 170° C. and more particularly between 40° C. and 120° C., and with stirring, for a sufficient period of time, for example between 10 minutes and 2 hours, to obtain complete dissolution of the ingredients in the hydrocarbon oil.

The respective concentrations of the various ingredients, in particular olefinic polymer containing epoxy or COOH groups, primary polymer and, if appropriate, reactive additive, in the mother solution can vary fairly widely, depending in particular on the nature of the hydrocarbon oil used to dissolve the said ingredients. Thus, the respective amounts of functionalized olefinic polymer and of primary polymer can advantageously represent 1% to 20% and 5% to 30% by weight of the hydrocarbon oil.

In order to prepare the bitumen/polymer compositions by resorting to the mother solution technique, the mother solution containing the functionalized olefinic polymer and the primary polymer and, if appropriate, the reactive additives is mixed with the bitumen or mixture of bitumens, the operation being carried out at temperatures of between 100° C. and 230° C., more particularly between 120° C. and 190° C., and with stirring, this being carried out, for example, by incorporating the mother solution in the bitumen or mixture of bitumens kept stirring at temperatures between 100° C. and 230° C. and more particularly between 120° C. and 190° C., and then the resulting mixture is kept stirring at temperatures of between 100° C. and 230° C., more particularly between 120° C. and 190° C., for example at the temperatures used for carrying out the mixing of the mother solution with the bitumen, for a period of time at least equal to 10 minutes and generally ranging from 10 minutes to 2 hours, to form a reaction product constituting the bitumen/polymer composition.

The amount of mother solution mixed with the bitumen or mixture of bitumens is chosen in order to provide the desired amounts, with respect to the bitumen, of olefinic polymer containing epoxy or COOH groups and of primary polymer, the said amounts being within the ranges defined above.

The bitumen/polymer compositions with improved stability according to the invention can be used as is or else diluted with variable proportions of a bitumen or mixture of bitumens or of a composition according to the invention having different characteristics, to constitute bitumen/polymer binders having a chosen content of polymers which can either be equal to (undiluted composition) or else lower than (diluted composition) the content of polymers in the corresponding initial bitumen/polymer compositions. The dilution of the bitumen/polymer compositions according to the invention with the bitumen or mixture of bitumens or with a composition according to the invention with different characteristics can be carried out either directly following the preparation of the said compositions, when a virtually immediate use of the resulting bitumen/polymer binders is required, or else alternatively after a more or less prolonged period of storage of the bitumen/polymer compositions, when a delayed use of the resulting bitumen/polymer binders is envisaged. The bitumen or mixture of bitumens used for the dilution of a bitumen/polymer composition according to the invention can be chosen from the bitumens defined above as being suitable for the preparation of the bitumen/polymer compositions.

The dilution of a bitumen/polymer composition by a bitumen or mixture of bitumens or by a second composition according to the invention with a lower content of polymers, in order to form a bitumen/polymer binder with a chosen content of polymers lower than that of the bitumen/polymer composition to be diluted, is generally carried out by bringing suitable proportions of the bitumen/polymer composition to be diluted and of bitumen or mixture of bitumens or of second bitumen/polymer composition according to the invention into contact, with stirring and at temperatures of between 100° C. and 230° C. and more particularly between 120° C. and 190° C.

The bitumen/polymer binders composed of the bitumen/polymer compositions according to the invention or resulting from the dilution of the said compositions by a bitumen or mixture of bitumens or by another bitumen/polymer composition according to the invention, up to the desired content of polymer (s) in the said binders, can be applied, directly or after conversion into aqueous emulsion, to the production of road surfacings of the surface coating type, to the production of bituminous mixes which are put in place with heating or cold, or else to the production of watertight facings.

The invention is illustrated by the following examples, given without implied limitation.

In these examples, the amounts and percentages are expressed by weight, except when otherwise indicated.

In addition, the rheological and mechanical characteristics of the bitumens or of the bitumen/polymer compositions to which reference is made in the said examples, namely penetrability and ring-and-ball softening point, are those defined above.

EXAMPLES 1 TO 6

Control bitumen/polymer compositions (Examples 1, 2 and 3) and bitumen/polymer compositions according to the invention (Examples 4, 5 and 6) were prepared, in order to evaluate and compare the physicomechanical characteristics thereof.

The preparations were carried out under the following conditions:

Example 1 (control)

965 parts of a bitumen having a penetrability, determined according to the procedures of NF Standard T 66004, within the range 50/70 and 35 parts of a random ethylene/vinyl acetate copolymer containing 18% of vinyl acetate and having a melt flow index, determined according to ASTM Standard D 1238, having a value equal to 150 g per 10 minutes were introduced into a reactor maintained at 175° C. and with stirring. The contents of the reactor were subsequently maintained at 175° C., with stirring, for a period of time of 2.5 hours, to produce the bitumen/polymer composition.

Example 2 (control)

The preparation was carried out as described in Example 1, the ethylene/vinyl acetate copolymer being replaced, however, by 20 parts of a polynorbornene with a molecular mass greater than $2 \times 10^6$ (Norsorex polynorbornene from Elf Atochem), and 980 parts of bitumen being used.

Example 3 (control)

The preparation was carried out as described in Example 1, the ethylene/vinyl acetate copolymer being replaced, however, by a low density polyethylene having a melt flow index, determined as indicated in Example 1, having a value equal to 1.2 g per 10 minutes.

Example 4 (according to the invention)

950 parts of the bitumen used in Example 1, as well as 35 parts of the ethylene/vinyl acetate copolymer used in Example 1 and 15 parts of an ethylene/methyl acrylate/glycidyl methacrylate terpolymer containing 24% of methyl acrylate and 8% of glycidyl methacrylate and having a melt flow index (ASTM Standard D 1238) having a value equal to 6 g per 10 minutes were introduced into a reactor maintained at 175° C. and with stirring. The contents of the reactor were subsequently maintained at 175° C., with stirring, for a period of time of 2.5 hours, to form the bitumen/polymer composition according to the invention.

Example 5 (according to the invention)

The preparation was carried out as described in Example 4, the ethylene/vinyl acetate copolymer being replaced, however, by 20 parts of the polynorbornene employed in Example 2, and 972.5 parts of bitumen and 7.5 parts of ethylene/methyl acrylate/glycidyl methacrylate terpolymer being used.

Example 6 (according to the invention)

The preparation was carried out as described in Example 4, the ethylene/vinyl acetate copolymer being replaced, however, by the low density polyethylene used in Example 3.

For each of the compositions obtained as indicated in Examples 1 to 6, the penetrability at 25° C. (Pen) and the ring-and-ball softening temperature (RBT) were determined.

In addition, a test of stability on storage at 180° C. for 3 days was carried out on each of the bitumen/polymer compositions obtained. This test consists in filling an aluminium tube, "toothpaste tube" type, with the composition to be studied and in maintaining the tube containing the composition at a temperature of 180° C. for the period of time chosen for the storage, namely 3 days. At the end of the said period of time, the tube is cooled and is then cut into three parts having substantially the same length. The penetration at 25° C. and the softening temperature of the composition are then determined in each of the top (upper third) and bottom (lower third) parts of the tube. The difference (Delta X) between the values of the characteristic X in the top part and the bottom part of the tube gives an indication of the stability of the bitumen/polymer composition. The composition becomes more stable as the difference "Delta X" becomes smaller.

The results obtained are collated in the table below.

In this table, the abbreviations BT, EVA, PNB, LDPE and TPO have the following meanings:

BT: unmodified bitumen with a penetrability within the range 50/70 used in the various examples;

EVA: random ethylene/vinyl acetate copolymer used in Examples 1 and 4;

PNB: polynorbornene used in Examples 2 and 5;

LDPE: low density polyethylene used in Examples 3 and 6;

TPO: ethylene/methyl acrylate/glycidyl methacrylate terpolymer used in Examples 4, 5 and 6.

The contents of EVA, PNB, LDPE and TPO in the compositions are expressed as percentages by weight of the overall amounts of bitumen and polymer(s).

TABLE

| Examples | BT | 1 | 2 | 3 | 4 | 5 | 6 |
|---|---|---|---|---|---|---|---|
| EVA (%) |  | 3.5 |  |  | 3.5 |  |  |
| PNB (%) |  |  | 2 |  |  | 2 |  |
| LDPE (%) |  |  |  | 3.5 |  |  | 3.5 |
| TPO (%) |  |  |  |  | 1.5 | 0.75 | 1.5 |
| Pen (1/10 mm) | 68 | 48 | 45 | 50 | 54 | 50 | 53 |
| RBT (° C.) | 49 | 56 | 62 | 59 | 59 | 70 | 63 |
| STORAGE AT 180° C. FOR 3 DAYS ||||||||
| Pen, Top (1/10 mm) | 68 | 83 | 70 | 100 | 54 | 52 | 52 |
| Pen, Bottom (1/10 min) | 68 | 42 | 30 | 30 | 53 | 50 | 50 |
| Delta Pen (1/10 mm) | 0 | 41 | 40 | 70 | 1 | 2 | 2 |
| RBT, Top (° C.) | 49 | 59 | 65 | 62 | 57 | 71 | 63 |
| RBT, Bottom (° C.) | 49 | 55 | 56 | 50 | 58 | 69 | 61 |
| Delta RBT (° C.) | 0 | 4 | 9 | 12 | −1 | 2 | 2 |

In the light of the results presented in the table, it is apparent that:

the base bitumen is stable, as expected;

the bitumen/polymer compositions based on a bitumen and on a primary polymer are all unstable on storage (Examples 1 to 3), the bitumen/polymer composition containing polyethylene (Example 3) being the most unstable;

the bitumen/polymer compositions according to the invention based on a bitumen, on a primary polymer and on a functionalized olefinic polymer, in this instance functionalized by epoxy groups (Examples 4 to 6), are notably more stable than the control bitumen/polymer compositions (Examples 1 to 3).

We claim:

1. Bitumen/polymer compositions with improved stability comprising a bitumen or mixture of bitumens and, by weight of the bitumen or mixture of bitumens, 0.3% to 20% of a primary polymer selected from the group consisting of polybutadiene, polyisoprene, polychloroprene, butadiene/isoprene copolymers, polynorbornene, polyisobutylene, butyl rubber, high density polyethylene, low density polyethylene, polypropylene, polybutene, random ethylene/propylene copolymers, random ethylene/propylene/diene terpolymers, ethylene/vinyl acetate copolymers, ethylene/styrene copolymers and ethylene/butene/styrene copolymers, the said compositions additionally containing, by weight of the bitumen or mixture of bitumens, 0.01% to 12% of at least one olefinic polymer containing epoxy functional groups and a member selected from the group consisting of (a) random copolymers of ethylene and of a monomer B selected from the group consisting of glycidyl acrylate and glycidyl methacrylate which contain, by weight, 80% to 99.7% of ethylene, (b) random terpolymers of ethylene, of a monomer A selected from the group consisting of vinyl acetate, alkyl acrylates containing a $C_1$ to $C_6$ alkyl residue and alkyl methacrylates containing a $C_1$ to $C_6$ alkyl residue and of a monomer B selected from the group consisting of glycidyl acrylate and glycidyl methacrylate which contain, by weight, 0.5% to 40% of units resulting from the monomer A and 0.5% to 15% of units resulting from the monomer B, the remainder being formed from units resulting from ethylene and (c) copolymers resulting from the grafting of a monomer B selected from the group consisting of glycidyl acrylate and glycidyl methacrylate on a substrate composed of a polymer selected from the group consisting of polyethylenes, polypropylenes, random copolymers of ethylene and of vinyl acetate, random copolymers of ethylene and of alkyl acrylate containing a $C_1$ to $C_6$ alkyl residue and random copolymers of ethylene and of alkyl methacrylate containing a $C_1$ to $C_6$ alkyl residue, which contain, by weight, 40% to 99.7% of ethylene, the said grafted copolymers containing, by weight, 0.5% to 15% of grafted units resulting from the monomer B.

2. Compositions according to claim 1 wherein the olefinic polymers containing epoxy groups are selected from the group consisting of:
   (i) random terpolymers of ethylene, of alkyl acrylate or methacrylate containing a $C_1$ to $C_6$ alkyl residue and of glycidyl acrylate or methacrylate which contain, by weight, 0.5% to 40% of units resulting from alkyl acrylate or methacrylate and 0.5% to 15% of units resulting from glycidyl acrylate or methacrylate, the remainder being formed from units resulting from ethylene and
   (ii) low density polyethylenes grafted with glycidyl acrylate or methacrylate and polypropylenes grafted with glycidyl acrylate or methacrylate which contain, by weight, 0.5% to 15% of grafted units resulting from the glycidyl acrylate or methacrylate.

3. Bitumen/polymer compositions with improved stability comprising a bitumen or mixture of bitumens and, by weight of the bitumen or mixture of bitumens, 0.3% to 20% of at least one primary polymer selected from the group consisting of polybutadiene, polyisoprene, polychloroprene, butadiene/isoprene copolymers, polynorbornene, polyisobutylene, butyl rubber, high density polyethylene, low density polyethylene, polypropylene, polybutene, random ethylene/propylene copolymers, random ethylene/propylene/diene terpolymers, ethylene/styrene copolymers and ethylene/butene/styrene copolymers, the said compositions additionally containing, by weight of the bitumen or mixture of bitumens, 0.01% to 12% of at least one olefinic polymer containing epoxy functional groups and a member selected from the group consisting of (a) random copolymers of ethylene and of a monomer B selected from the group consisting of glycidyl acrylate and glycidyl methacrylate which contain, by weight, 80% to 99.7% of ethylene, (b) random terpolymers of ethylene, of a monomer A selected from the group consisting of vinyl acetate, alkyl acrylates containing a $C_1$ to $C_6$ alkyl residue and alkyl methacrylates containing a $C_1$ to $C_6$ alkyl residue and of a monomer B selected from the group consisting of glycidyl acrylate and glycidyl methacrylate which contain, by weight, 0.5% to 40% of units resulting from the monomer A and 0.5% to 15% of units resulting from the monomer B, the remainder being formed from units resulting from ethylene and (c) copolymers resulting from the grafting of a monomer B selected from the group consisting of glycidyl acrylate and glycidyl methacrylate, on a polyethylene or polypropylene substrate, said grafted copolymers containing, by weight, 0.5% to 15% of grafted units resulting from the monomer B.

4. Compositions according to claim 1, wherein the content of primary polymer represents 0.5% to 10% of the weight of bitumen or mixture of bitumens.

5. Compositions according to claim 1, wherein the content of olefinic polymer containing epoxy or COOH functional groups represents 0.1% to 5% of the weight of bitumen or mixture of bitumens.

6. Compositions according to claim 1 wherein, the olefinic polymers containing epoxy groups have a melt flow index, determined according to ASTM Standard D 1238, having a value, expressed in grams per 10 minutes, of between 0.3 and 3000.

7. Compositions according to claim 1, wherein the bitumen or mixture of bitumens is chosen from bitumens having a kinematic viscosity at 100° C. of between $0.5 \times 10^{-4}$ $m^2/s$ and $3 \times 10^{-2}$ $m^2/s$.

8. Compositions according to claim 7, wherein the bitumen or mixture of bitumens exhibits a penetrability at 25° C., defined according to NF Standard T 66004, of between 5 and 800.

9. Compositions according to claim 1, wherein they are obtained by bringing the primary polymer or polymers and the olefinic polymer or polymers containing epoxy groups into contact with the bitumen or mixture of bitumens in the chosen proportions, the operation being carried out at temperatures of between 100° C. and 230° C., and with stirring, for a period of time of at least 10 minutes, to form a homogeneous mass constituting the bitumen/polymer composition.

10. Compositions according to claim 1, wherein they additionally contain 1% to 40%, by weight of the bitumen or mixture of bitumens, of a fluxing agent.

11. Compositions according to claim 10, wherein the fluxing agent is composed of a hydrocarbon oil exhibiting an atmospheric pressure distillation range, determined according to ASTM Standard D 86-67, of between 100° C. and 600° C.

12. Compositions according to claim 11, wherein the hydrocarbon oil is selected from the group consisting of petroleum cuts of aromatic nature, petroleum cuts of naphtheno-aromatic nature, petroleum cuts of naphtheno-paraffinic nature, petroleum cuts of paraffinic nature, coal oils and oils of plant origin.

13. Compositions according to claim 11 or 12, which are obtained by incorporating the olefinic polymer containing epoxy groups and the primary polymer in the bitumen or mixture of bitumens in the form of a mother solution of these polymers in the hydrocarbon oil constituting the fluxing agent.

14. Compositions according to claim 13, wherein the mother solution contains, by weight of the hydrocarbon oil, 1% to 20% of olefinic polymer containing epoxy or COOH groups and 5% to 30% of primary polymer.

15. Compositions according to claim 13, which are obtained by mixing the mother solution with the bitumen or mixture of bitumens, the operation being carried out at temperatures of between 100° C. and 230° C., and with stirring, and the resulting mixture then being kept stirring at temperatures of between 100° C. and 230° C., for a period of time at least equal to 10 minutes, to form a reaction product constituting the bitumen/polymer composition.

16. Compositions according to claim 1, which contain one or more non-polymer additives capable of reacting with the epoxy groups of the olefinic polymer carrying the said groups, the said reactive additives being primary or secondary amines, polyamines, alcohols, polyols, acids, polyacids, or alternatively compounds of metals from groups I, II, III and VIII of the Periodic Table of the Elements.

17. Compositions according to claim 16, wherein the amount of reactive additive or of reactive additives which they contain represents 0.01% to 10% of the weight of the bitumen.

18. A coating composition comprised of a bitumen/polymer binder composed of the bitumen/polymer compositions of claim 1.

19. A road surface coating comprised of the coating composition of claim 18.

20. Watertight facings comprised of the coating compositions of claim 18.

* * * * *

UNITED STATES PATENT AND TRADEMARK OFFICE
CERTIFICATE OF CORRECTION

PATENT NO. : 6,020,404
DATED : February 1, 2000
INVENTOR(S) : Jean-Pascal PLANCHE, Patrice TURELLO and Claude LACOUR It is certified that error appears in the above-identified patent and that said Letters Patent is hereby corrected as shown below:

Column 1, lines 26 and 28: the term "0°C" should read --°C-- line 32: the word "Theological" should read --rheological--

Column 2, line 45: in the formula "$CH_2$" should be --CH-- and "$R_3$" should be --$R_1$--

Column 5, line 31: "of" should be inserted between "implementation" and "the process"

Claims 5 and 14: "or COOH" should be deleted

Claim 13: "or 12" should be deleted

Signed and Sealed this

Fifth Day of December, 2000

Attest:

Q. TODD DICKINSON

Attesting Officer     Director of Patents and Trademarks